United States Patent
Leibovitz et al.

(10) Patent No.: US 10,824,815 B2
(45) Date of Patent: Nov. 3, 2020

(54) DOCUMENT CLASSIFICATION USING ATTENTION NETWORKS

(71) Applicant: NETAPP, INC., Sunnyvale, CA (US)

(72) Inventors: Guy Leibovitz, Tel Aviv (IL); Adam Bali, Tel Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/237,853

(22) Filed: Jan. 2, 2019

(65) Prior Publication Data
US 2020/0210526 A1 Jul. 2, 2020

(51) Int. Cl.
| G06F 17/27 | (2006.01) |
| G06F 40/30 | (2020.01) |
| G06F 16/35 | (2019.01) |
| G06N 3/04 | (2006.01) |
| G06N 3/08 | (2006.01) |
| G06F 16/93 | (2019.01) |

(52) U.S. Cl.
CPC ........... *G06F 40/30* (2020.01); *G06F 16/355* (2019.01); *G06F 16/93* (2019.01); *G06N 3/0445* (2013.01); *G06N 3/08* (2013.01)

(58) Field of Classification Search
CPC ...................................................... G06F 17/27
USPC ................. 704/230, 7, 10, 235, 500, 9, 232; 706/25, 20, 19, 15
See application file for complete search history.

(56) References Cited

U.S. PATENT DOCUMENTS

| 5,251,286 A * | 10/1993 | Wiener ..................... G01V 3/38 706/20 |
| 5,442,730 A * | 8/1995 | Bigus ..................... G06F 9/4881 706/19 |
| 5,526,281 A * | 6/1996 | Chapman ................ C07K 1/00 702/22 |
| 5,554,273 A * | 9/1996 | Demmin ............ G01N 27/4163 204/406 |
| 5,699,449 A * | 12/1997 | Javidi ................ G06K 9/00221 382/156 |
| 5,956,702 A | 9/1999 | Matsuoka et al. |
| 6,269,351 B1 * | 7/2001 | Black ..................... G06F 16/30 706/15 |

(Continued)

FOREIGN PATENT DOCUMENTS

WO 2016145379 A1 9/2016

OTHER PUBLICATIONS

Zichao et al, Hierarchical Attention Networks for Document Classification, Jun. 2016, Carnegie Melon, all pages.*

(Continued)

*Primary Examiner* — Michael Colucci
(74) *Attorney, Agent, or Firm* — Haynes and Boone, LLP (57) ABSTRACT

A system comprising at least one hardware processor; and a non-transitory computer-readable storage medium having stored thereon program instructions, the program instructions executable by the at least one hardware processor to: receive, as input, a plurality of electronic documents, apply a trained machine learning classifier to automatically classify at least some of said plurality of electronic documents, wherein said machine learning classifier comprises two or more attention layers, and wherein at least one of the attention layers comprises an adjustable parameter which controls a distribution of attention weights assigned by said attention layer.

27 Claims, 4 Drawing Sheets

(56) References Cited

U.S. PATENT DOCUMENTS

| | | | |
|---|---|---|---|
| 6,440,067 B1* | 8/2002 | DeLuca | A61B 5/0002 128/920 |
| 6,601,052 B1* | 7/2003 | Lee | G06N 3/0454 706/25 |
| 8,572,011 B1* | 10/2013 | Sculley, II | G06N 20/00 706/13 |
| 9,627,532 B2* | 4/2017 | Gemello | H01L 21/823437 |
| 10,354,184 B1* | 7/2019 | Vitaladevuni | G06Q 30/0251 |
| 2004/0093315 A1* | 5/2004 | Carney | G06N 3/0454 706/15 |
| 2005/0122516 A1* | 6/2005 | Sezginer | G03F 7/70633 356/401 |
| 2009/0220166 A1* | 9/2009 | Choi | H04L 51/12 382/260 |
| 2010/0179855 A1* | 7/2010 | Chen | G06Q 30/0201 705/7.31 |
| 2010/0179961 A1* | 7/2010 | Berry | G06F 40/284 707/769 |
| 2011/0176724 A1* | 7/2011 | Yang | G06K 9/6252 382/159 |
| 2012/0054131 A1* | 3/2012 | Williamson | G06N 20/00 706/12 |
| 2012/0179567 A1* | 7/2012 | Soroca | G06Q 30/08 705/26.3 |
| 2013/0212047 A1* | 8/2013 | Lai | G06Q 10/107 706/12 |
| 2013/0262096 A1 | 10/2013 | Wilhelms-Tricarico et al. | |
| 2015/0006444 A1* | 1/2015 | Tamatsu | G06N 3/082 706/12 |
| 2016/0078361 A1* | 3/2016 | Brueckner | H04L 67/10 706/12 |
| 2017/0011738 A1 | 1/2017 | Senior et al. | |
| 2019/0012374 A1* | 1/2019 | Petroni | G06F 16/9537 |

OTHER PUBLICATIONS

Zhang et al, User-guided Hierarchical Attention Network for Multi-modal social Image Popularity Prediction, Apr. 2018, all pages.*

Zichao Yang et al, "Hierarchical Attention Networks for Document Classification", Conference of the North American Chapter of the Association for Computational Linguistics: Human Language Technologies, 2016, pp. 1480-1489.

T. Mikolov et al, "Efficient Estimation of Word Representations in Vector Space", arXiv preprint arXiv:1301.3781, Sep. 7, 2013.

Jeffrey Pennington et al, "GloVe: Global Vectors for Word Representation", Association for Computational Linguistics, 2014, pp. 1532-1543.

Dzmitry Bandanau et al, "Neural Machine Translation by Jointly Learning to Align and Translate", arXiv:1409.0473, 2014.

Christopher Manning et al, "The Stanford CoreNLP Natural Language Processing Toolkit", Association for Computational Linguistics, Jun. 2014, pp. 55-60.

* cited by examiner

CASH/BARTER
SERIES OFFER

DATE: May 12, 2000          STATION:   WFXV/WPNY

MARKET:    Utica, NY

SALESPERSON: SEAN TRIGONY

SHOW:    *DONNY & MARIE (2000 – 2001)*

YEAR:    3

NUMBER OF EPISODES: Up to 160

TERM:    52 WEEKS

CONTRACT
START DATE:    September, 2000          ENDING:    September, 2001

Is start date On or BEFORE?    YES/NO

Barter Split                            10.5   minutes (Station)
Time Period:                            3.5    minutes (CTTD)

First Daily Telecast:    Monday through Friday 9 AM to 1 AM

WEEKLY LICENSE FEE:  BARTER       TOTAL LICENSE FEE:  BARTER

Payments:

Total: 12    STARTING: 09/00    MONTHLY: BARTER    FINA: BARTER

Is payment start date ON or BEFORE?    Yes/no

TIME PERIOD PROVISIONS:

Is the increased/decreased license fee for the remainder of the term?    YES/NO LICENSEE:   Quorum Broadcasting of Utica, Inc.
            6878 Greenfield Road
            Rome, NY 13440

DOCUMENT CLASSIFICATION USING ATTENTION NETWORKS

BACKGROUND

The invention relates to the field of machine learning.

Automatic text classification is a common task in Natural Language Processing, in which the goal is to assign labels to textual data. A simple approach to text classification is using sparse n-grams representations together with linear or kernel methods, thus relying on frequency of terms within each text, regardless of their order. Other Neural Network-based approaches include Convolutional Networks and Recurrent Networks. Convolutional Neural Networks allow for a more flexible representation of textual patterns, while Recurrent Neural Networks such as GRUs and LSTMs, which rely on sequential patterns, provide a deeper, more profound method to learn textual representations.

Hierarchical Attention Networks (HAN) have been recently suggested for text classification. A HAN may capture insights from the hierarchical structure of documents by constructing two attention layers: word-level and sentence-level. See, e.g., Yang, Zichao et al. "Hierarchical Attention Networks for Document Classification." *In n Proceedings of the 2016 Conference of the North American Chapter of the Association for Computational Linguistics: Human Language Technologies*. (2016).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, a plurality of electronic documents, and apply a trained machine learning classifier to automatically classify at least some of said plurality of electronic documents, wherein said machine learning classifier comprises two or more attention layers, and wherein at least one of the attention layers comprises an adjustable parameter which controls a distribution of attention weights assigned by said attention layer.

There is also provided, in an embodiment, a method comprising receiving, as input, a plurality of electronic documents, and applying a trained machine learning classifier to automatically classify at least some of said plurality of electronic documents, wherein said machine learning classifier comprises two or more attention layers, and wherein at least one of the attention layers comprises an adjustable parameter which controls a distribution of attention weights assigned by said attention layer.

There is further provided, in an embodiment, a computer program product comprising a non-transitory computer-readable storage medium having program instructions embodied therewith, the program instructions executable by at least one hardware processor to: receive, as input, a plurality of electronic documents, and apply a trained machine learning classifier to automatically classify at least some of said plurality of electronic documents, wherein said machine learning classifier comprises two or more attention layers, and wherein at least one of the attention layers comprises an adjustable parameter which controls a distribution of attention weights assigned by said attention layer.

In some embodiments, said parameter is a derivable temperature parameter which is adjustable by a user during an inference stage of said machine learning classifier, and wherein said adjustment changes said distribution of attention weights.

In some embodiments, said two or more attention layers are part of a Hierarchical Attention Network (HAN) comprising at least a word attention layer and a sentence attention layer.

In some embodiments, said word attention layer is configured to selectively choose words in a document of said plurality of electronic documents, based, at least in part, on a word attention weight calculated for each of said words.

In some embodiments, said calculation is based, at least in part, on contextual information for each of said words, wherein said contextual information is obtained based, at least in part, on a bidirectional gated recurrent unit (GRU).

In some embodiments, said calculation is further based, at least in part, on said parameter.

In some embodiments, when said adjustment increases said parameter, said word attention layer tends to choose more of said words, and when said adjustment decreases said parameter, said word attention layer tends to choose fewer of said words.

In some embodiments, said sentence attention layer is configured to calculate a sentence attention weight for at least some sentences in said document based, at least in part, on a weighted sum of said word attention weights in each of said sentences.

In some embodiments, the program instructions are further executable to calculate, and in the case of the method, the method further comprises calculating, a vector representation of each of said plurality of electronic documents, based, at least in part, on a weighted sum of said sentence attention weights, wherein said classifying is based, at least in part, on said vector representation.

In some embodiments, the program instructions are further executable to train, and in the case of the method, the method further comprises training, said machine learning classifier based, at least in part, on a training set comprising: (i) said vector representations, and (ii) a label associated with each of said vector representations.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, system, and computer program product for automated document classification using a Hierarchical Attention Networks (HAN)-based classification model. In some embodiments, the use of a HAN-based model is configured for capturing a context-dependent importance of words and sentences to the classification of a document.

In some embodiments, the present HAN-based classification model is further configured for providing insight into the words in a document that were most significant for its classification, e.g., through visualization that highlights one or more words in the classified document. In some embodiments, the highlighted (attended) words could suggest which terms the model linked most to the assigned document class.

In some embodiments, the present model is configured for permitting adjustments in the distribution of attention weights during the inference stage, to provide for fine-tuning of the model based on classification results. Accordingly, a user of the classification model may be able to adjust a sensitivity of the model, based on an assessment of the visualized attended words in the output.

In some embodiments, the distribution adjustment can be made after the network has been trained, without the need for lengthy re-training. In some embodiments, the adjustments are achieved by introducing into the model a temperature parameter which allows for flexible changes in the distribution of weights after the network has been trained.

As used herein, the terms 'document' or 'electronic document' refer broadly to any digital document containing mainly text and stored in a computer-readable format. Electronic document formats may include, among others, Portable Document Format (PDF), Digital Visual Interface (DVI), PostScript, word processing file formats, such as docx, doc, and Rich Text Format (RTF), and/or XML Paper Specification (XPS).

Document classification is a known task in the field of information retrieval and machine learning, and it plays an important role in a variety of applications. Embodiments of the present invention may contribute to enterprise content management, by ensuring that enterprise documents are stored in a logical, organized manner which makes it easy to retrieve the information quickly and efficiently. An automated document classification tool according to some embodiments can thus realize a significant reduction in manual entry costs, and improve the speed and turnaround time for document processing. Such tools may be especially useful for publishers, financial institutions, insurance companies, and/or any industry that deals with large amounts of content.

Although neural networks can be powerful tools to learn efficiently from data, one of the shortcomings of their complex architectures, which is full of hidden layers, is the lack of interpretability, i.e., the difficulty to uncover the contributing factors for a given classification result. For example, in classification based on neural networks, it may be difficult to figure out the most contributing factors of an input to the model's output, which, in the case of text classification, may be, e.g., the frequency of textual patterns or sequences most affecting the network's prediction.

Figure 1:
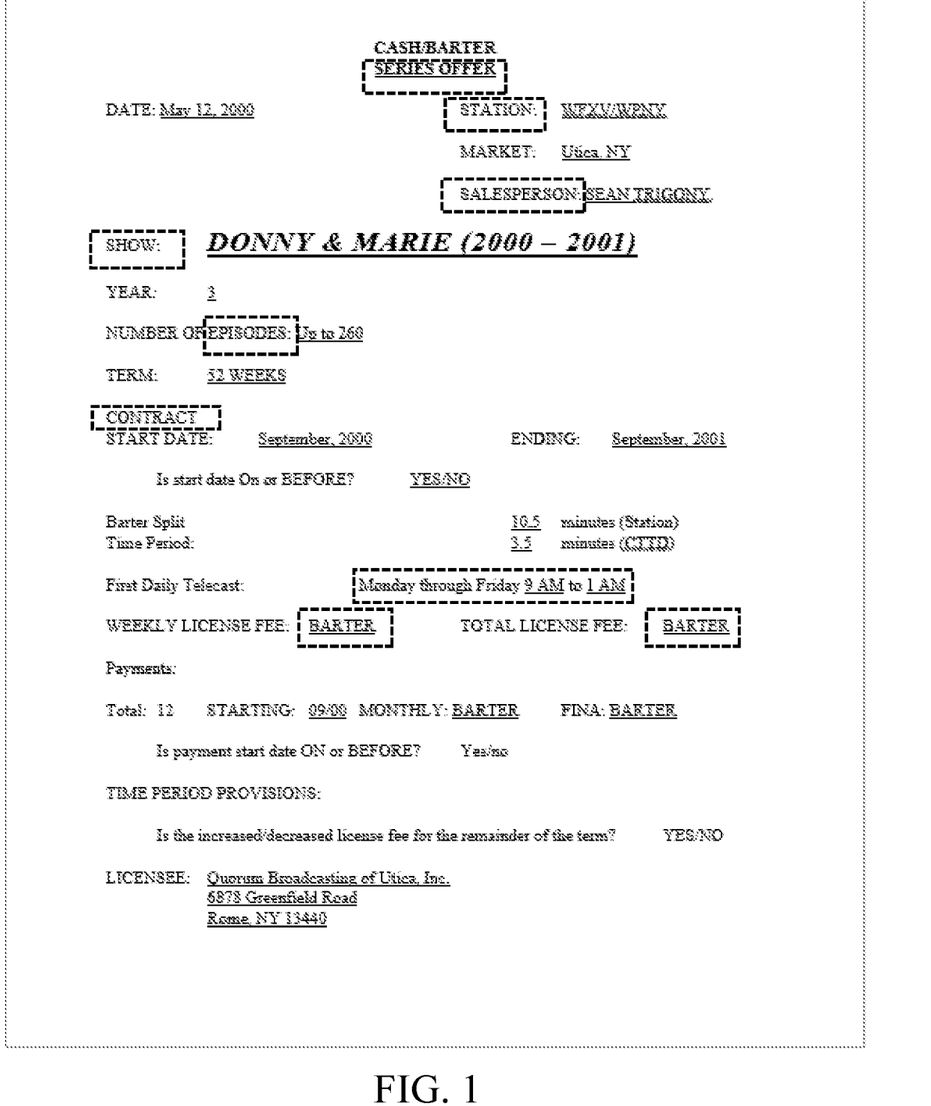
FIG. 1 illustrates a classified document with highlighted words indicating word significance, according to an embodiment.

Because individual words cannot be classified as inherently important or unimportant, their importance in the hierarchy of a document depends on their context. FIG. 1 shows an example of a sales-related enterprise document. Different words will contribute differently to the overall classification of the document as a sales offer in the area of broadcasting. For example, the repeated word barter, as well as the words offer and contract indicate that this is a sales-related document. The words show, episodes, and station indicate may contribute more strongly to the classification of the document as related to broadcasting.

HAN models can reveal, through insight into the attention layers of the network, which words and which sentences impacted the model's classification, wherein both word and sentence levels of impact rely highly on the context in which they appear, due to the architecture of the attention network. Accordingly, better representations may be obtained by incorporating knowledge of document structure in the model architecture. This assumption is based on the idea that not all parts of a document are equally relevant for classification purposes, and that determining the relevant sections involves modeling the interactions and context of the words, and not only their mere presence in isolation.

The attention mechanism may be used in sequence-to-sequence models to utilize context, based on hidden states, into the current state. For example, a context vector $C_i$ may be calculated as an average of the previous states, and weighted with the attention scores $a_i$:

$$C_i = \sum_j a_{ij} s_j$$

$$a_i = \text{softmax}(\text{flattention}(h_i, s_j)).$$

HAN-based models, however, typically require relatively long training periods. This, in turn, sets practical limits with respect to re-training and fine tuning of the model based on results.

In some embodiments, the present invention may provide for a HAN-based classification model configured for classifying one or more documents received as input. In some embodiments, the present HAN-based classification model is configured for capturing a hierarchical structure of the document (i.e., from words, to sentences, to document), as well as a context-dependent importance of words and sentences.

In some embodiments, the present HAN-based classification model is further configured for permitting flexible changes in the distribution of weights after the network has been trained, to provide for fine-tuning of the model based on classification results, without the need for lengthy re-training.

In some embodiments, the present model may be configured for bi- or multi-class classifications. For example, the present model may be configured for classifying documents into one of two mutually-exclusive types (e.g., sensitive or non-sensitive documents). In multi-class applications, the present model may be trained to classify document into one of multiple categories, e.g., financial (invoices, balance sheets, purchase orders), human resources (resumes, employee contracts, employee reviews, compensation), legal (non-disclosure agreements, vendor-customer contracts), etc.

In some embodiments, the present model is further configured for providing insight into which words in a document are more significant for its classification, e.g., by highlighting one or more words in the classified document. In some embodiments, the highlighted (attended) words could suggest which terms the model linked most to the assigned document class. Accordingly, a user may adjust a sensitivity of the model based on an assessment of the attended words in the output.

Figure 2:
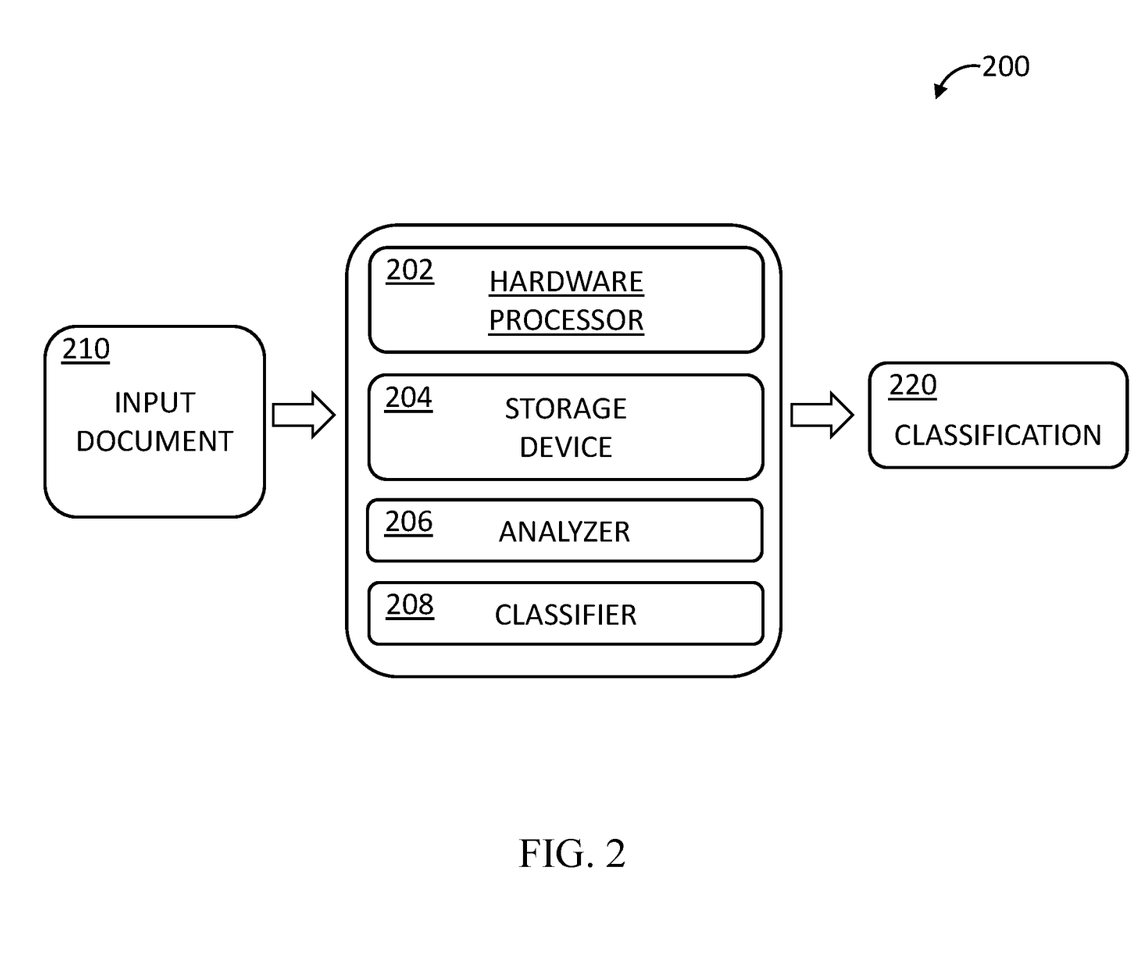
FIG. 2 schematically illustrates a system for automated document classification using a Hierarchical Attention Networks-based classification model.

FIG. 2 is a block diagram of an exemplary system 200 for automated document classification using a HAN-based classification model, according to an embodiment. System 200 may comprise one or more hardware processors 202, and a non-transitory computer-readable storage device 204. System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. In various embodiments, system 200 may comprise one or more dedicated hardware devices, one or more software modules, and/or may form an addition to or extension to an existing device.

Storage medium 204 may have encoded thereon software instructions or components configured to operate a processing unit (also "hardware processor," "CPU," or simply "processor"), such as hardware processor(s) 202. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., an analyzer 206 and a classifier 208.

Figure 3:
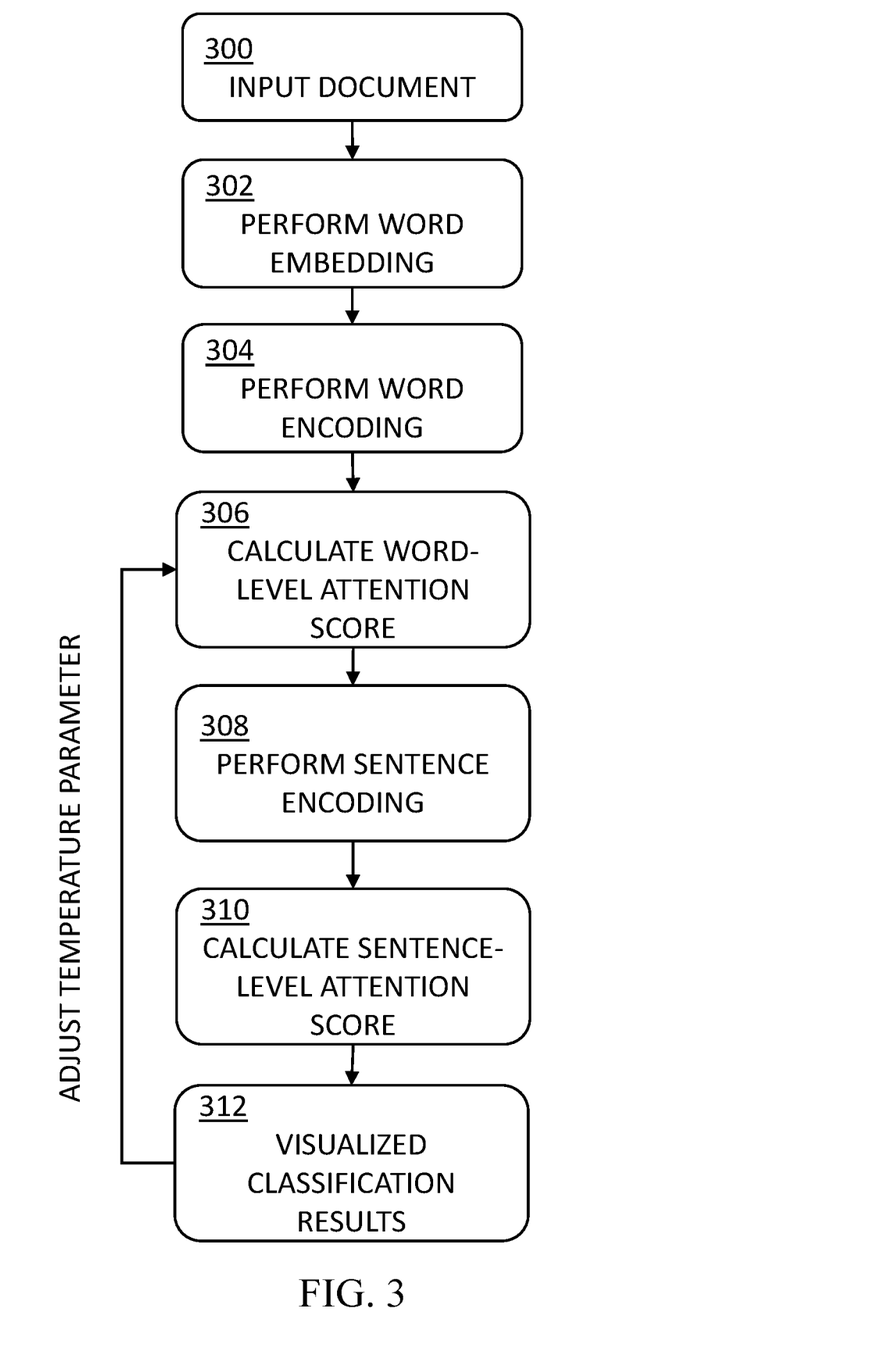
FIG. 3 is a flowchart of the functional steps in a method for automated document classification using a Hierarchical Attention Networks-based classification model.

With reference to the flowchart in FIG. 3, in some embodiments, a HAN-based classification system of the present invention, such as system 200 in FIG. 2, may begin at a step 300 with one or more documents received as input 210, e.g., document d comprising L sentences $S_i$, wherein each sentence comprises a sequence of words $T_i$. $W_{it}$, with $t \in [1, T]$, represents words in the $i^{th}$ sentence. In some embodiments, the present model is configured for deriving a document-level vector representation, wherein the document-level representation is generated from word-level and sentence-level vectors using a hierarchical structure.

Figure 4:
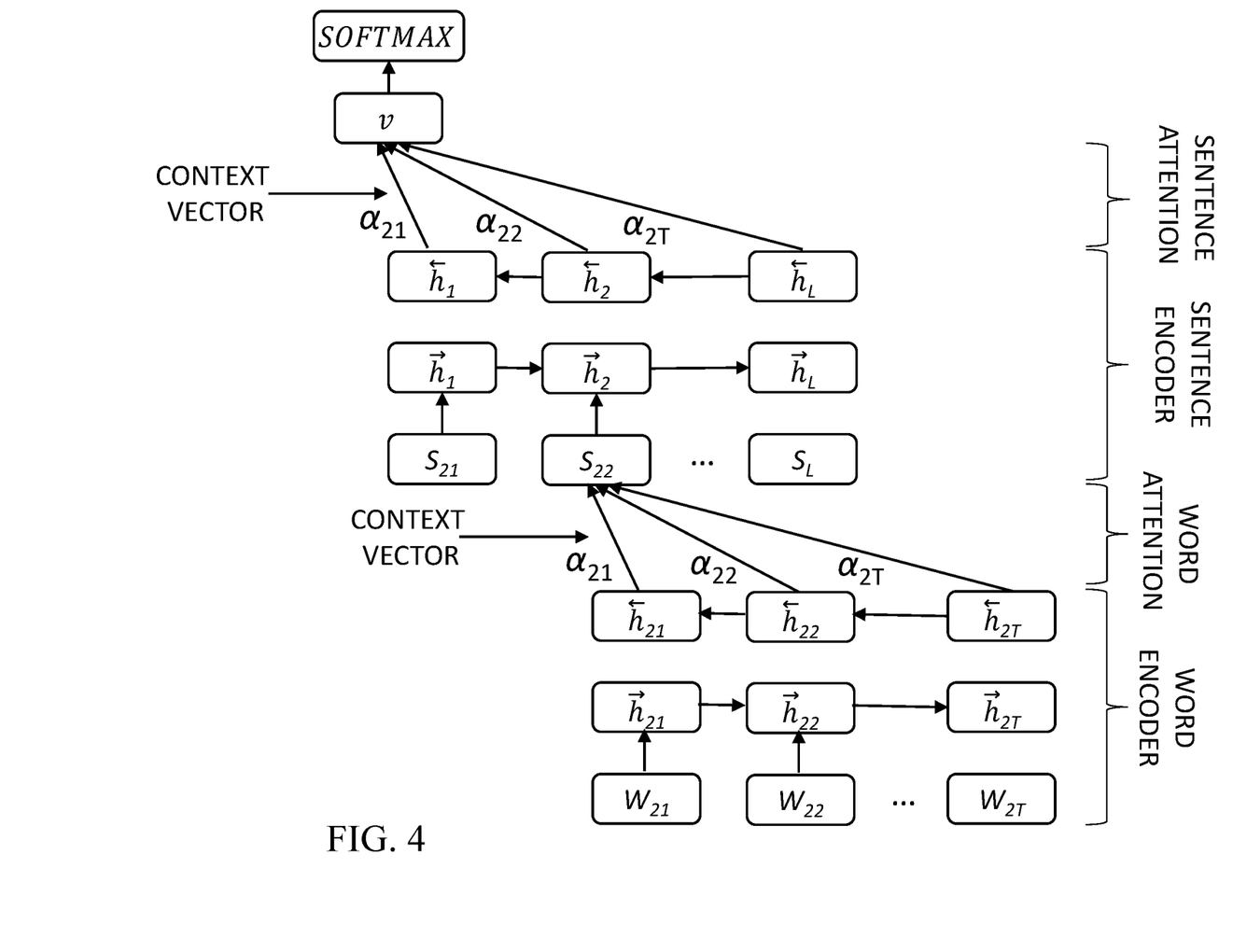
FIG. 4 is an illustration of a hierarchical attention network.

FIG. 4 is a schematic illustration of a hierarchical network of the type used in conjunction with the present model. As can be seen, the network consists of a word sequence encoder, a word-level attention layer, a sentence encoder and a sentence-level attention layer, wherein a document vector v is derived progressively from word vectors and sentence vectors.

In some embodiments, the present model is configured for training a document classifier based, at least in part, on the vector representations of input documents.

In some embodiments, at a step 302, analyzer 206 is configured for first performing a word embedding into vectors with respect to each word, based on semantic similarities. In some embodiments, the word embedding may be performed using a pre-trained embedding model, such as Word2Vec (see, T. Mikolov et al.; "Efficient estimation of word representations in vector space," arXiv preprint arXiv:1301.3781, 2013), or GloVe (see Jeffrey Pennington, Richard Socher, and Christopher D. Manning; 2014; "GloVe: Global Vectors for Word Representation").

Given a sentence with words $W_{it}$, $t \in [1, T]$, the words are first embedded to vectors through an embedding matrix $W_e$, $$X_{ij} = W_e * w_{ij}.$$

In some embodiments, at a next step 304, a bidirectional GRU (see, D. Bandanau et al.; 2014; "Neural machine translation by jointly learning to align and translate"; arXiv preprint arXiv:1409.0473) is applied to get annotations of words by summarizing information from both directions in the sentence, thereby incorporating the contextual information in the annotation. In some embodiments, the bidirectional GRU contains the forward GRU $\overrightarrow{f}$, which reads the sentence $S_i$ from $W_{i1}$ to $W_{iT}$ and a backward GRU $\overleftarrow{f}$, which reads from $W_{iT}$ to $W_{i1}$:

$$x_{it} = W_e w_{it}, t \in [1, T],$$

$$\overrightarrow{h}_{it} = \overrightarrow{GRU}(x_{it}), t \in [1, T],$$

$$\overleftarrow{h}_{it} = \overleftarrow{GRU}(x_{it}), t \in [T, 1].$$

This way, a contextual information for any given word with $w_{it}$ is obtained by concatenating the forward hidden state $\overrightarrow{h}_{it}$ and backward hidden state $\overleftarrow{h}_{it}$ to summarize the information of the whole sentence centered around word $w_{it}$:

$$h_{it} = [\overrightarrow{h}_{it}, \overleftarrow{h}_{it}].$$

Next, at a step 306, an attention mechanism is used to attach a weighted score to the more informative words, and thus compute a sentence vector as a weighted sum of word encoding with the associated weighted attention score. In some embodiments, the attention mechanism is configured for extracting such words that are important to the meaning of the sentence, and aggregate the representation of those informative words to form a sentence vector.

In some embodiments, the attention mechanism further comprises a temperature parameter C configured for extracting a summed representation that over-weights the more informative words into each higher-level sentence representation.

The temperature parameter may be used to control model predictions by scaling the output of the attention layer. Thus, using a higher temperature parameter increases the sensitivity of the attention layer to lower probability candidate words, resulting in a larger number and greater diversity of attended words, which may also generate a larger number of false positives. Conversely, decreasing the temperature parameter also decreases the layer's sensitivity, resulting in fewer attended words having higher probabilities. Accordingly, a user of the classification model may decrease the temperature parameter upon noticing, e.g., that the visualized results contain too many words that are not specific enough to the predicted class.

Accordingly, a word attention layer comprising a temperature parameter of the present invention may be represented as:

$$u_{it} = \tanh(W_w h_{it} + b_w),$$

$$\alpha_{it} = \frac{e^{\frac{u_{it}^T u_w}{c}}}{\sum_t e^{\frac{u_{it}^T u_w}{c}}},$$

$$s_i = \sum_t \alpha_{it} h_{it},$$

where $u_{it}$ is the hidden representation of the word annotation $h_{it}$, and where the importance of the word may be expressed as the similarity of $u_{it}$ with a word level context vector $u_w$. A sentence vector $s_i$ may then be computed as a weighted sum of the word annotations. The word context vector $u_w$ is randomly initialized and jointly learned during the training process.

In some embodiments, the temperature parameter C is initialized with a fixed value of 1, and may be adjustable after training, during an inference stage of the model.

In some embodiments, at a step 308, given sentences vectors $s_i$ obtained at step 306, a sentence encoding is performed, in a manner similar to the word encoding in step 304 using a bidirectional GRU. In some embodiments, the present model is configured for encoding each sentence in the document to obtain an annotation of sentence i, $h_i$, which summarizes the neighboring sentences around sentence i:

$$\vec{h}_i = \overrightarrow{GRU}(s_i), i \in [1, L],$$

$$\overleftarrow{h}_i = \overleftarrow{GRU}(s_i), t \in [L, 1],$$

$$h_i = [\vec{h}_i, \overleftarrow{h}_i].$$

Next, at a step 310, an attention mechanism is applied to the sentence-level encoding, to reward sentences that are more meaningful within the document, and then compute a document vector as a weighted sum of the sentences encoding with their weighted attention. In some embodiments, an attention mechanism is applied to produce a sentence level context vector $u_s$, which is used to measure the importance of the sentence:

$$u_i = \tanh(W_s h_i + b_s),$$

$$\alpha_i = \frac{\exp(u_i^T u_s)}{\sum_i \exp(u_i^T u_s)},$$

$$v = \sum_i \alpha_i h_i.$$

Document vector v is the document vector that summarizes all the information of sentences in a document. Similarly, the sentence level context vector can be randomly initialized and jointly learned during the training process.

At a step 312, document vector v is input as a high-level vector representation for the given document, to produce a document classification. In some embodiments, the document classification network is a fully connected layer with a softmax activation function:

$$p = \text{softmax}(W_c v + b_c),$$

with a categorical-cross-entropy (also referred to as negative log-likelihood) training loss function on the correct labels predicted:

$$L = -\sum_d \log p_{dj},$$

where j is the predicted label of document d.

In some embodiments, the model may provide visualized insight into the attended words which the model considered most significant to the classification, with their corresponding attention score, calculated using the temperature parameter C in step 306. With reference back to FIG. 1, in some embodiments, such insight may be provided as visualization of the hierarchical attention layers, e.g., by highlighting or otherwise denoting significant words with their corresponding attention score. Each line in the document may be considered a sentence, wherein a sentence weight may be a weighted sum of word weights in the sentence. For example, in FIG. 1, words such as show, episodes, and station may all be assigned high significance for topical classification of the document, in combination with words such as barter, contract, and sales. Conversely, words such as year, before, and starting may not contribute to the classification.

In some embodiments, at any point during inference step 312, the temperature parameter C may be adjusted by a user based on the quality of results, to cause the model to repeat steps 306-312 with a different sensitivity. For example, if the words highlighted by the model in the results are seen as too general and not specific enough to the topic, a user may decrease the temperature parameter, to cause the model to select fewer attended words having higher probabilities.

In some embodiments, the present classification model may be trained on any given dataset of documents and their corresponding labels. In some embodiments, a training set for the present model may be generated by breaking down documents into sentences, and then tokenizing each sentence into words, e.g., using a natural language processing tool, such as CoreNLP (see, Manning et al.; 2014; "The Sanford CoreNLP natural language processing toolkit"; In Proceedings of 52nd Annual Meeting of the Association for Computational Linguistics: System Demonstrations, pages 55-60.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a memory containing a machine readable medium comprising machine executable code having stored thereon instructions for performing a method of automated document classification; and
   a processor coupled to the memory, the processor configured to execute the machine executable code to cause the processor to:
   receive, as input, an electronic document;
   apply a trained machine learning classifier comprising two attention layers to automatically classify the electronic document, wherein at least one of the attention layers comprises an adjustable parameter which controls a distribution of attention weights assigned by the at least one attention layer;
   adjust the adjustable parameter after training and during an inference stage of the machine learning classifier to change the distribution of attention weights; and
   repeat application of the trained machine learning classifier to the electronic document after adjusting the adjustable parameter, wherein the machine learning classifier is not re-trained between adjusting the adjustable parameter and repeating application of the trained machine learning classifier.

2. The computing device of claim 1, wherein the two attention layers are part of a Hierarchical Attention Network (HAN) comprising a word attention layer and a sentence attention layer.

3. The computing device of claim 1, wherein a word attention layer from among the two attention layers is configured to selectively choose words in the electronic document, based, at least in part, on a word attention weight calculated for each of the words.

4. The computing device of claim 1, wherein a calculation for the attention weights assigned by the at least one attention layer is based, at least in part, on contextual information for words in the electronic document, wherein the contextual information is obtained based, at least in part, on a bidirectional gated recurrent unit (GRU).

5. The computing device of claim 1, wherein a calculation for the attention weights assigned by the at least one attention layer is based, at least in part, on the adjustable parameter.

6. The computing device of claim 1, wherein an increase to the adjustable parameter increases a sensitivity of the machine learning classifier to select more words in the electronic document, and a decrease to the adjustable parameter decreases the sensitivity of the machine learning classifier to select fewer words in the electronic document.

7. The computing device of claim 1, wherein a sentence attention layer from among the two attention layers is configured to calculate a sentence attention weight for at least some sentences in the electronic document based, at least in part, on a weighted sum of word attention weights in each of the sentences.

8. The computing device of claim 1, the machine executable code further causing the processor to:
calculate a vector representation of the electronic document based, at least in part, on a weighted sum of sentence attention weights that are based on a weighted sum of word attention weights for sentences of the electronic document, the automatic classifying being based, at least in part, on the vector representation.

9. The computing device of claim 1, the machine executable code further causing the processor to:
train the machine learning classifier based, at least in part, on a training set comprising vector representations of sentence attention weights from one of the attention layers and a label associated with each of the vector representations.

10. A method comprising:
receiving, by a server as input, an electronic document;
applying, by the server, a trained machine learning classifier comprising two attention layers to automatically classify the electronic document, wherein at least one of the attention layers comprises an adjustable parameter which controls a distribution of attention weights assigned by the at least one attention layer;
adjusting the adjustable parameter after training and during an inference stage of the machine learning classifier to change the distribution of attention weights; and
repeating, by the server, application of the trained machine learning classifier to the electronic document after adjusting the adjustable parameter, wherein the machine learning classifier is not re-trained between adjusting the adjustable parameter and repeating application of the trained machine learning classifier.

11. The method of claim 10, wherein the two attention layers are part of a Hierarchical Attention Network (HAN) comprising a word attention layer and a sentence attention layer.

12. The method of claim 10, further comprising:
selectively choosing, by a word attention layer from among the two attention layers at the server, words in the electronic document based, at least in part, on a word attention weight calculated for each of the words.

13. The method of claim 10, further comprising:
calculating, by the server, the attention weights assigned by the at least one attention layer based, at least in part, on contextual information for words in the electronic document, wherein the contextual information is obtained based, at least in part, on a bidirectional gated recurrent unit (GRU).

14. The method of claim 10, further comprising:
calculating, by the server, the attention weights assigned by the at least one attention layer based, at least in part, on the adjustable parameter.

15. The method of claim 10, wherein an increase to the adjustable parameter increases a sensitivity of the machine learning classifier to select one or more words in the electronic document, and a decrease to the adjustable parameter decreases the sensitivity of the machine learning classifier to select fewer words in the electronic document.

16. The method of claim 10, further comprising:
calculating, by a sentence attention layer from among the two attention layers at the server, a sentence attention weight for at least some sentences in the electronic document based, at least in part, on a weighted sum of word attention weights in each of the sentences.

17. The method of claim 10, further comprising:
calculating, by the server, a vector representation of the electronic document based, at least in part, on a weighted sum of sentence attention weights that are based on a weighted sum of word attention weights for sentences of the electronic document, the automatic classifying being based, at least in part, on the vector representation.

18. The method of claim 10, further comprising:
training the machine learning classifier based, at least in part, on a training set comprising vector representations of sentence attention weights from one of the attention layers and a label associated with each of the vector representations.

19. A non-transitory machine readable medium having stored thereon instructions for performing a method comprising machine executable code which, when executed by at least machine, causes the machine to:
receive, as input, an electronic document;
apply a trained machine learning classifier comprising two attention layers to automatically classify the electronic document, wherein at least one of the attention layers comprises an adjustable parameter which controls a distribution of attention weights assigned by the at least one attention layer;
adjust the adjustable parameter after training and during an inference stage of the machine learning classifier to change the distribution of attention weights; and
repeat application of the trained machine learning classifier to the electronic document after adjusting the adjustable parameter, wherein the machine learning classifier is not re-trained between adjusting the adjustable parameter and repeating application of the trained machine learning classifier.

20. The non-transitory machine readable medium of claim 19, wherein the two attention layers are part of a Hierarchical Attention Network (HAN) comprising a word attention layer and a sentence attention layer.

21. The non-transitory machine readable medium of claim 19, further comprising machine executable code that causes the machine to:
selectively choosing, by a word attention layer from among the two attention layers, words in the electronic document based, at least in part, on a word attention weight calculated for each of the words.

22. The non-transitory machine readable medium of claim 19, further comprising machine executable code that causes the machine to:
calculate the attention weights assigned by the at least one attention layer based, at least in part, on contextual information for words in the electronic document, wherein the contextual information is obtained based, at least in part, on a bidirectional gated recurrent unit (GRU).

23. The non-transitory machine readable medium of claim 19, further comprising machine executable code that causes the machine to:
calculate the attention weights assigned by the at least one attention layer based, at least in part, on the adjustable parameter.

24. The non-transitory machine readable medium of claim 19, wherein an increase to the adjustable parameter increases a sensitivity of the machine learning classifier to select one or more words in the electronic document, and a decrease to the adjustable parameter decreases the sensitivity of the machine learning classifier to select fewer words in the electronic document.

25. The non-transitory machine readable medium of claim 19, further comprising machine executable code that causes the machine to:
calculate, by a sentence attention layer from among the two attention layers, a sentence attention weight for at least some sentences in the electronic document based, at least in part, on a weighted sum of word attention weights in each of the sentences.

26. The non-transitory machine readable medium of claim 19, further comprising machine executable code that causes the machine to:
calculate a vector representation of the electronic document based, at least in part, on a weighted sum of sentence attention weights that are based on a weighted sum of word attention weights for sentences of the electronic document, the automatically classifying being based, at least in part, on the vector representation.

27. The non-transitory machine readable medium of claim 19, further comprising machine executable code that causes the machine to:
train the machine learning classifier based, at least in part, on a training set comprising vector representations of sentence attention weights from one of the attention layers and a label associated with each of the vector representations.

* * * * *